United States Patent [19]

Raymond et al.

[11] 4,213,329

[45] Jul. 22, 1980

[54] METHOD AND APPARATUS FOR INSPECTING CONTAINERS

[75] Inventors: Samuel O. Raymond, North Falmouth; Gary G. Hayward, Falmouth, both of Mass.

[73] Assignee: Benthos, Inc., N. Falmouth, Mass.

[21] Appl. No.: 5,799

[22] Filed: Jan. 23, 1979

[51] Int. Cl.² ............................................. G01M 3/00
[52] U.S. Cl. ........................................ 73/52; 209/599
[58] Field of Search .............................. 73/52; 209/599

[56] References Cited

U.S. PATENT DOCUMENTS

| 2,320,390 | 6/1943 | Shmurak | 73/52 |
| 2,608,089 | 8/1952 | Raymond et al. | 73/52 |
| 3,290,922 | 12/1966 | Thompson | 73/52 |
| 3,441,132 | 4/1969 | Browning | 73/52 X |
| 3,596,501 | 8/1971 | Forry et al. | 73/52 |
| 3,802,252 | 4/1974 | Hayward et al. | 73/52 |
| 3,832,885 | 9/1974 | Hayward et al. | 73/52 |

FOREIGN PATENT DOCUMENTS

| 1003367 | 9/1965 | United Kingdom | 73/52 |
| 1037533 | 7/1966 | United Kingdom | 73/52 |

*Primary Examiner*—Donald Watkins
*Assistant Examiner*—Joseph W. Roskos
*Attorney, Agent, or Firm*—Schiller & Pandiscio

[57] ABSTRACT

A method and apparatus are provided for inspecting vacuum-packed containers. The invention comprises automatically subjecting each container to be inspected to a predetermined force so as to cause each container to emit a click as a result of relative displacement of the container and its liquid contents, and determining whether the container has adequate vacuum by measuring the time interval between application of the predetermined force and the occurrence of the click. In a modification of the invention the pressure determenation is made by generating a signal having an amplitude that varies according to the intensity of the click.

28 Claims, 6 Drawing Figures

METHOD AND APPARATUS FOR INSPECTING CONTAINERS

This invention pertains to the art of inspecting sealed containers of vacuum packed commodities to determine the level of vacuum and more particularly to a novel apparatus and method for inspecting vacuum packed containers by mechanically striking them so as to produce an audible signal.

A great many food and pharmaceutical products are packed in containers under vacuum for diverse reasons, in particular to retain flavor, extend shelf life and avoid contamination. For obvious reasons it is essential to inspect such containers for vacuum before they are distributed for sale, since it is possible for some containers to have little or no vacuum as a result of an imperfect seal or a failure to pull a sufficient vacuum before sealing. Presently two types of devices are used to inspect sealed containers to determine whether they have adequate vacuum. One type of device illustrated in U.S. Pat. Nos. 3,802,252 and 3,832,885 is adapted to tap a metal end wall or cap with an electromagnetic pulse, which causes the end wall or cap to vibrate and produce a tone with a frequency proportional to the vacuum in the container. Accurate frequency discriminating means are used to determine the degree of vacuum. The other type of device checks vacuum by magnetically measuring the amount of deflection of the end wall or cap resulting from the vacuum in the container.

However, a number of common types of containers exist which cannot be accurately inspected by devices of the foregoing type. One example is bottles containing intravenous (IV) solutions which have rubber stoppers. Since the latter are elastomeric and non-magnetic, they will not respond to systems employing electromagnetic tapping and magnetic measurement of cap deflection. Also presenting a problem are metal-capped, small-necked bottles such as are used to hold grape juice or ketchup. Since the caps are relatively small and hence very stiff, the tone produced by the cap when it is tapped electromagnetically changes imperceptibly with vacuum. Also since the cap deflects very little with vacuum, magnetic measurement of the amount of cap deflection is not an accurate basis for measuring vacuum. A problem also exists in the case of cans which are filled with products which press against both ends of the cans. The pressure exerted by the products tends to prevent the sealed containers from responding consistently to electromagnetic tapping and also may provide erroneous results where the degree of deflection is used as a measure of vacuum.

Heretofore another method of testing for vacuum has been used in connection with narrow-necked IV bottles. We have determined that this method (which we prefer to term "Cavitation Tapping") may be used with evacuated bottles containing a high viscosity liquid such as ketchup (sometimes called a semiliquid) as well as with containers of a low viscosity liquid such as an IV solution. As heretofore practiced, cavitation tapping involves holding a container such as an IV bottle in one hand and delivering a sharp downward blow to the cap with a rubber mallet wielded with the other hand. If a vacuum exists in the bottle, a sound like a click will be heard. If no sound is heard, the container is rejected. However, this method is quite slow since it is manual in nature. Furthermore, it has been recognized that its accuracy is limited by its dependency on the audio recognition capability and work concentration of the individual inspector, and also the magnitude of the force striking the bottle. A further limitation is that it must be carried out in a very quiet environment since an inspector's ability to hear a click is affected by background noise. Despite those limitations the cavitation tapping technique has been in commercial use recently prior to this invention for want of better inspection methods.

Accordingly the primary object of this invention is to improve upon the existing method and apparatus for carrying out the cavitation tapping technique.

A further object is to provide a unique method and apparatus for causing a vacuum-packed container to emit a click sound as described above.

A more specific object is to provide a new method and apparatus for (a) subjecting vacuum packed containers to cavitation tapping and (b) determining the acceptability of the level of vacuum in the containers from the click-like sound produced by the cavitation tapping.

Still another object is to provide a new method and means for assuring that vacuum-packed containers are suitably preconditioned for cavitation tapping.

Another object is to provide a novel method and apparatus for sensing a click emanating from a vacuum-packed container and also a novel method and apparatus for evaluating the click to determine whether the vacuum in the container is at an acceptable level.

Yet another object is to provide a novel method and system for automatically and rapidly inspecting vacuum-packed containers with an accuracy and reliability superior to manual cavitation tapping methods.

These and other objects hereinafter stated or made obvious are achieved by providing means for mechanically and automatically subjecting each vacuum-packed container to be inspected to a predetermined force so as to cause the container to emit a click, and means for sensing the click. According to a preferred embodiment of the invention, the inspection further comprises measuring the time interval between application of the predetermined force and the occurrence of the click, and providing a signal indicative of whether a container is to be rejected or accepted according to the magnitude of said time interval. Apparatus constructed in accordance with this invention also is arranged to physically pre-condition the vacuum-packed containers to make certain that a click will be produced in response to the applied predetermined force, and in the preferred embodiment the force is applied by driving each container against a fixed obstruction and sensing the click produced after the container has been stopped by the obstruction. According to an alternative embodiment of the invention, the level of vacuum in a bottle is determined to be acceptable or not by measuring the sound intensity of the click.

Other features and many of the attendant purposes and advantages of the invention are described or rendered obvious by the following detailed description of a preferred embodiment and modification of the invention and the accompanying drawings wherein.

The same numerals are used to designate identical parts in the drawings.

Figure 1:
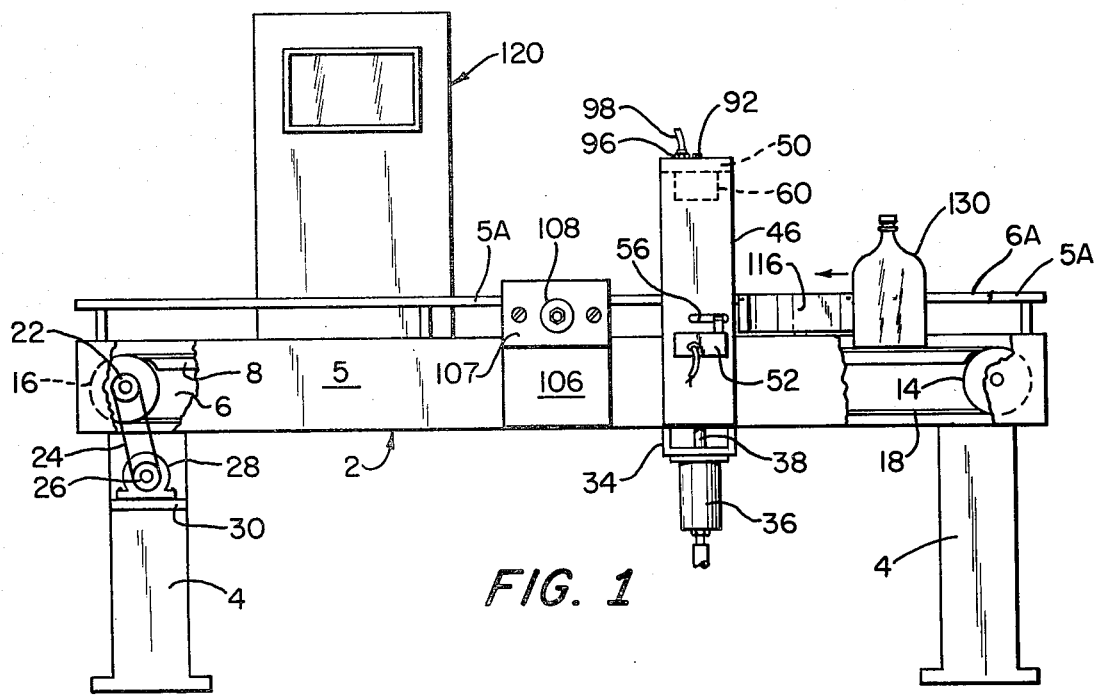
FIG. 1 is a side view in elevation of a preferred embodiment of the invention.

We have elected to use the term "cavitation tapping" because the click appears to involve a cavitation phenomenon. When a vacuum-packed container is struck on top with a mallet as previously described, relative motion occurs between the bottle and its liquid contents and at least one cavity is formed in the lower region of the bottle as the liquid moves down under the impact of the hammer. Thereafter as the liquid moves downward as a secondary effect of the blow of the mallet, the cavity collapses and produces a hydrodynamic shock wave or slamming action in the liquid which travels through the wall of the container into the atmosphere. This slamming action produces an audible "click".

Heretofore it has been considered that for a blow of given magnitude the intensity of the click produced will vary with different degrees of vacuum in the container, so that if a bottle does not have sufficient vacuum, no click will be heard. However, we have discovered that while the intensity of the click will tend to vary with vacuum, it is possible, for example, with an IV bottle having a vacuum which is insufficient to assure that the IV solution is and will remain sterile, to produce a click if the bottle is struck hard enough. Thus the manual method of cavitation tapping a vacuum packed container is unsatisfactory since it is possible with a strong enough blow to obtain a click from a bottle which should be rejected. On the other hand if a vacuum-packed bottle of a liquid such as ketchup is struck hard enough, it is possible for the liquid to destroy the bottle when it slams against the bottom of the bottle.

We also have determined that the ability to discriminate between vacuum-packed containers on the basis of a difference in the amplitude or frequency of the clicks is limited because for many products the amplitude and frequency differences of clicks due to different levels of vacuum are not sufficiently large and consistent, or consistently distinctive, to serve as an accurate and reliable measure. Accurately determining the level of vacuum in a container is critical in the case of sterile liquid products such as IV solutions. For other products a lesser accuracy may be acceptable.

We also have discovered several new and interesting aspects. For one thing it is possible to generate a click by thrusting a vacuum-packed container, such as a bottle of ketchup, upwards so that its top end or cap is intercepted by a resilient anvil. When the container strikes the anvil, it stops but the fluid keeps moving upward. If there is sufficient vacuum in the space above the liquid, cavitation will occur in the lower region of the liquid as the latter tries to continue upward, even though the container has stopped (or actually reversed itself due to the resilience of the anvil). In this connection it should be noted that most, if not all, vacuum packed containers are not fully packed and the remaining space is generally described as being a vacuum. In reality, however, it is a partial vacuum since it is at a pressure $P_1$ which is low in comparison to atmospheric pressure. When cavitation occurs, the cavitation cavity contains product vapor at the vapor pressure $P_v$ of the liquid product in the bottle (for aqueous solutions at room temperature, i.e., 20° C., the vapor pressure is in the order of about 0.025 atmosphere) and the gas in the partial vacuum space at the upper end of the container is compressed by the upwardly moving liquid to a pressure $P_2$ greater than $P_1$. This pressure prevents a click from occurring when the liquid reaches the upper end of the bottle and instead it acts to force the liquid back down and slam it against the bottom of the container. This slamming action produces a click.

We also have discovered that the click which results from the sudden acceleration or deceleration of the container will have a time delay which is a function of the magnitude of vacuum in the container. To be specific, the greater the level of vacuum in the container (i.e. the lesser the pressure $P_1$), the longer it takes for the click to occur after the container has been subjected to sudden acceleration and deceleration by striking it with a sharp force on top or bottom and driving it against a resilient restraint or obstruction.

A further discovery is that it appears to be advantageous, at least in the case of low viscosity liquids such as IV salt solutions, to precondition the vacuum-packed container by agitating the liquid so that it is not in a quiescent state at the time it is subjected to cavitation tapping. The agitation does not have to be severe and sufficient liquid stirring appears to occur in moving containers about by hand or by a conveyor. It appears that it is easier, i.e. less force is required, to generate a click with a preconditioned container than one in which the liquid is in a quiescent state. The exact reason for this apparent advantage of agitating the container is not clear.

Figure 2:
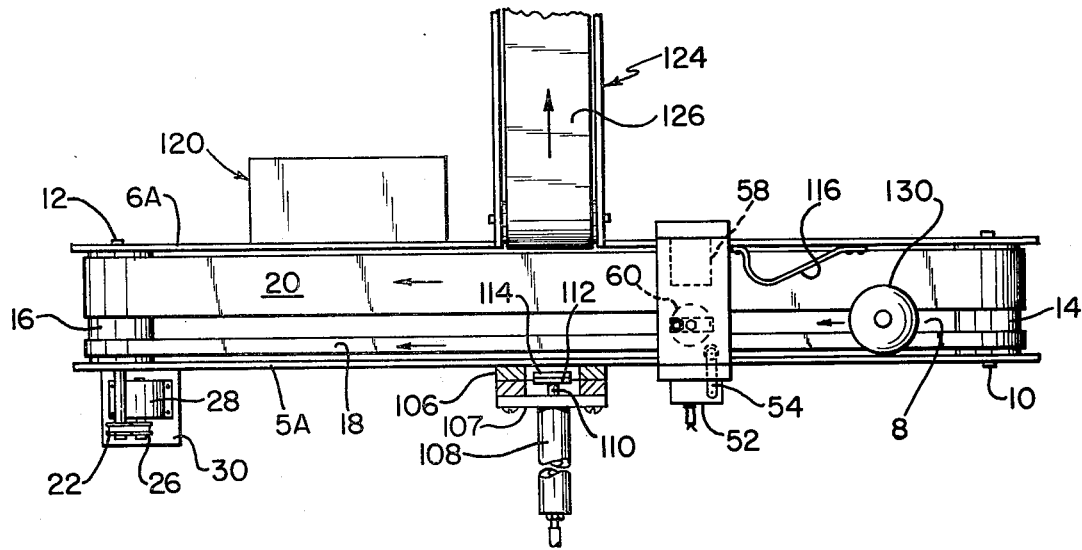
FIG. 2 is a plan view of the apparatus of FIG. 1.

Referring now to FIGS. 1 and 2, the illustrated apparatus comprises a conveyor assembly having a frame 2 which is supported on a pair of pedestal members 4 and comprises a pair of parallel horizontally extending side plates 5 and 6 and a support plate 8 which extends between and is secured to the two side plates. Journaled in the two side plates at opposite ends thereof are two shafts 10 and 12 on which are mounted pulleys 14 and 16 respectively. The two pulleys carry two endless belts 18 and 20 disposed side by side, with the two belts riding in suitable grooves in the two pulleys so that they cannot move laterally toward one another. Shaft 12 also carries pulley 22 which is driven by an endless belt 24 and a drive pulley 26, the latter being attached to the output shaft of a motor 28 which is mounted on a pedestal 30 affixed to one of the supports 4.

Figure 3:
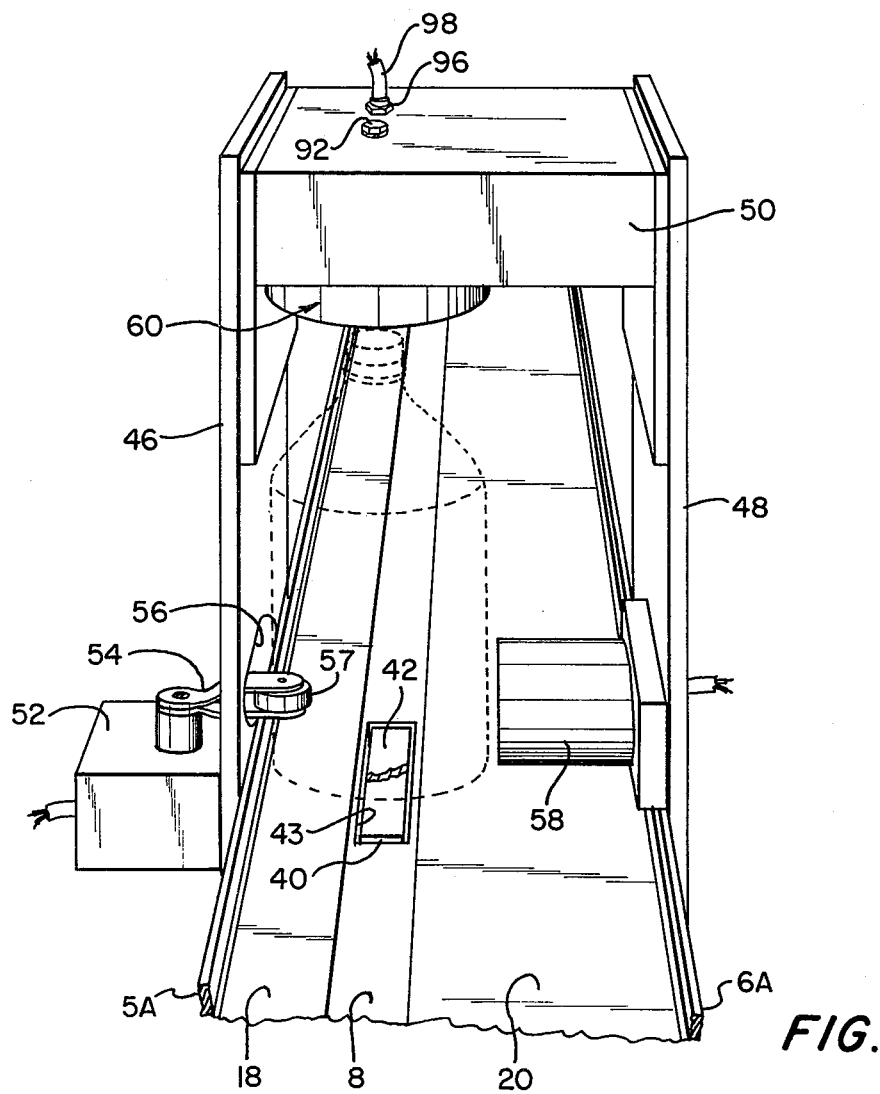
FIG. 3 is an enlarged fragmentary perspective view of the same apparatus.

Attached to the underside of and extending between the two side plates 5 and 6 is a support plate 34 to which is affixed a double acting pneumatic actuator 36. The piston rod 38 of actuator 36 extends through an oversized hole in support plate 34 and affixed to its upper end is a container lifter in the form of a metal bar 40 with a resilient pad 42 attached to and completely overlying its upper surface. Support plate 8 has a rectangular aperture 43 which is located between the two belts 18 and 20, as shown in FIG. 3, and is slightly larger than bar 40 so as to permit the latter to be moved vertically by actuator 36. The latter is arranged so that in the absence of high pressure air, piston rod 38 is retracted and the resilient cushion 42 is located below the upper surface of the upper run of conveyors 18 and 20; preferably it is flush with the upper surface of support plate 8.

Also mounted to the conveyor assembly is a yoke structure comprising two parallel vertically extending plates 46 and 48 which are connected together at their upper ends by a metal plate 50. Side plates 46 and 48 are attached to the side plates 5 and 6 respectively of the conveyor assembly. Attached to the vertical plate 46 is a limit switch 52 having an operating arm 54 that projects through a horizontally elongate hole 56 in side plate 46. Attached to the free end of arm 54 is a roller 57 Although not shown, it is to be understood that switch 52 is of the type where its operating arm 54 is spring biased to a first at-rest position (FIG. 2), with the switch changing states when the arm is moved against its spring bias to a second predetermined position. In the illustrated apparatus, when the switch is in its at-rest position, the arm 54 projects over and extends generally transversely of the conveyor belt 18 and is movable in a counterclockwise direction (as viewed in FIG. 2) to its second position to cause the switch to change states.

Attached to side plate 48 opposite to the switch 52 is a microphone assembly 58. As seen in FIG. 3, microphone assembly 58 and the container lifter are aligned along a line which is perpendicular to the line of travel of the container and is downstream of switch arm 54. The microphone assembly 58 is preferably directional, with its maximum response being to sound coming from the direction of the container lifter.

Figure 4:
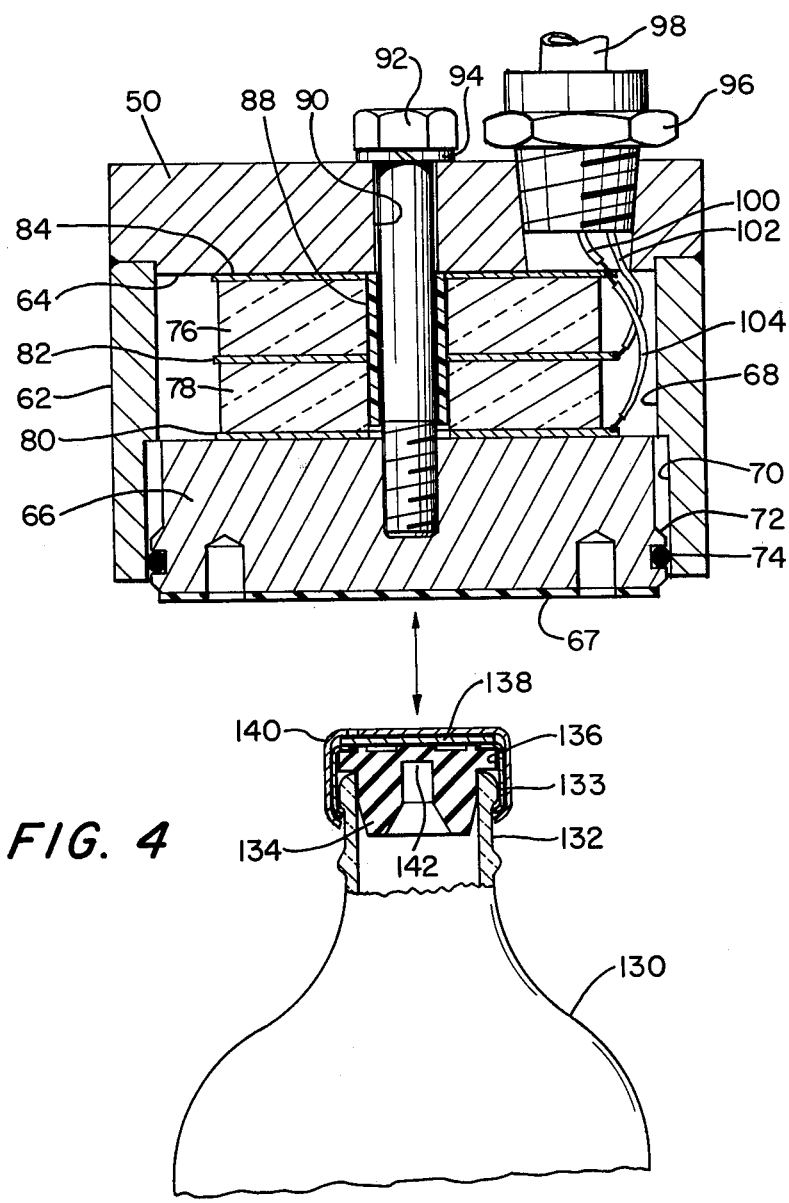
FIG. 4 is an enlarged cross-sectional view in elevation of a portion of the same apparatus.

Plate 50 serves as a rigid support for an anvil/detector assembly identified generally by the numeral 60. Preferably the anvil/detector assembly has a construction as shown in FIG. 4. Thus the anvil/detector assembly preferably comprises a cylindrical housing 62 which is attached to support plate 50. The latter is formed with a cylindrical projection 64 which makes a snug fit within the upper end of housing 62, and the latter is preferably attached to plate 50 by welding. Housing 62 has a first section 68 with a relatively small inner diameter and a second section 70 with a relatively large inner diameter, and disposed within the housing is an anvil member in the form of a circular plate 66 which is sized at its inner end so as to fit within the smaller diameter section 68. Anvil plate 66 is formed with a flange 72 which is slightly smaller than the inner diameter of section 70 of the housing. Flange 72 is provided with a groove to receive an O-ring 74 which makes a snug sliding fit with the surrounding inner surface of the counterbore housing section 70. O-ring 74 serves to prevent dust and moisture from entering between anvil plate 66 and housing 62. Disposed between the support plate 50 and anvil plate 66 is a detector assembly comprising a pair of ceramic piezoelectric disks 76 and 78 and three contacts in the form of relatively thin flexible metal plates 80, 82 and 84. The piezoelectric disks and the metal plates are provided with matching center holes to accommodate an insulating sleeve 88. Plate 50 is provided with a hole 90 to accommodate a bolt 92 which extends through the insulating sleeves 88 and is screwed into a tapped hole formed in the upper end of anvil plate 66. A lock washer 94 may be interposed between the head of bolts 92 and the support plate 50 so as to prevent release of the bolt by shock or vibration. The bolt 92 is screwed into the anvil plate 66 so as to draw the latter up tight against the sandwich formed by the two piezoelectric disks and the three conductor plates, clamping that sandwich against support plate 50. Plate 50 also has a second hole to receive a metal connector 96 for a cable 98. The latter has two electrical leads 100 and 102, with lead 100 being connected to contact 84 and also to a third conductor 104 which in turn is connected to contact 80. Cable lead 102 is connected to contact 82. Accordingly, metal plate 82 acts as a common contact for the two ceramic disks 76 and 78.

Turning now to FIGS. 1 and 2, a vertical plate 106 is attached to the side frame 5. Attached to plate 106 by means of a suitable support 107 is a single acting pneumatic actuator 108 which has a piston rod 110 that extends through an oversized hole in the plate. Attached to the free end of the piston rod 110 is a disk 112 having a resilient cushion or bumper 114 attached thereto. Actuator 108 is arranged so that in the absence of high pressure air, its piston rod 110 is retracted with the bumper 114 disposed so that it does not protrude into the space between side frame members 5 and 6, i.e., beyond the inner surface of member 5 and the inner surface of a fence 5A which is attached to side frame member 5 above actuator 108. A second identical fence 6A is attached to and disposed above the side frame member 6. For convenience of illustration, the frame members 5 and 6 are omitted from FIGS. 2 and 3.

Although not shown, it is to be understood that the apparatus of FIG. 1 is associated with a suitable feed mechanism for delivering containers to be inspected oney by one onto the continuously moving conveyor belts 18 and 20. The containers are deposited on the conveyor belts so that they engage and move along the inner surfaces of the upper portion of side frame member 5 and the fence 5A. If desired, a suitable guide member 116 may be attached to the inner side of the side frame member 6 so as to make certain that the containers are directed against the fence 5A and centered on the space between the two conveyor belts. Accordingly, as the bottles travel on the conveyor belts, they pass directly beneath the anvil/detector assembly 60. As each container moves under the anvil/detector assembly, it engages the roller 57 and moves the switch arm 54 counterclockwise to its second switch position. Arm 54 is held in its second position until the bottle is substantially centered beneath the anvil/detector assembly, at which point the bottle frees arm 54 and the latter rotates clockwise back to its original at-rest position. When this occurs, high pressure air is applied to the pneumatic actuator 36, with the result that the member 40 is rapidly moved upward, driving the bottle up against the anvil plate 66. The throw of the piston rod 38 is set so that the bottle engages the anvil plate 66 at the end of the stroke of the piston rod, and the flow of high pressure air is shifted to the reverse side of actuator 36 almost immediately after it is applied to the front side of the actuator, thereby causing the piston rod 38 to retract rapidly into the actuator 36 and allowing the container to fall back down onto the two conveyors 18 and 20. When the container strikes the anvil plate, it causes the latter to exert a compressive force on the two piezoelectric elements 76 and 78, with the result that a potential is generated by the two piezoelectric elements. The signal output from the piezoelectric elements is transmitted by the cable 98 to a control panel 120 which contains suitable signal processing circuitry hereinafter described. The application of air to the actuator 36 is controlled by operation of switch 52 via control circuitry and pneumatic valves contained within the control panel 120. The signal generated by the piezoelectric elements 76 and 78 is employed, as hereinafter described, to determine whether or not the inspected container has a sufficient vacuum. If the inspected container has sufficient vacuum, the inspected container is allowed to continue its travel on the continuously moving conveyor belts 18 and 20 to a suitable destination. On the other hand, if the bottle is determined to have insufficient vacuum, the signal processing circuits provide a signal which is used to cause a short burst of high pressure air to be applied to the actuator 108 so as to force bumper 114 to engage the inspected bottle and thrust it laterally off of the conveyor. The right hand side plate 6 and the fence 6A are provided with an opening whereby containers may be directed off of the conveyor belt 18 and 20 for reprocessing or disposal. Preferably a second reject conveyor 124 having an endless continously moving conveyor belt 126 is used to deliver the rejected containers to a disposal or reprocessing area.

For the purpose of better appreciating the advantages of the present invention, FIG. 4 contains a fragmentary sectional view of the upper portion of a typical IV bottle 132 which is characterized by a narrow neck 132 having a lip or flange 133. A rubber stopper 134 is positioned within and makes a pressure tight fit with the neck 132. Overlying the rubber stopper 134 and extending down over its sides and tightly engaging flange 133 is a metal retainer 136 which is annular at its top end so as to permit access to stopper 134. Overlying the retainer member 136 is a flat metal disk 138. Disk 138 is engaged at its outer margin by a clamp ring member 140 which extends down over the retainer member 136 and is bent under the lower edge of the latter so as to be held by the latter. Clamp ring member 140 is typically made of aluminum or some other soft metal and is provided with a tab (not shown) which permits it to be torn in two at a selected line so that it can be removed from the bottl to free disk 138 and expose the upper surface of the stopper. The retainer member 136 remains in place on the bottle, and access to the bottle is made by inserting a hypodermic syringe through the stopper into the bottle. For this purpose the center portion of the stopper is provided with a relatively thin section 142 which is impervious to air and moisture yet is thin enough to be punctured by the hyperdermic needle. As will be appreciated by persons skilled in the art, it is essential that whatever method is used to inspect the sealed IV bottle be capable of determining the extent of vacuum in the bottle without disrupting or causing deterioration of the seal provided by the rubber stopper 134 and the associated elements 136 and 138 and 140. This requirement is met by the apparatus of FIGS. 1-4 since the force with which the containers are driven against anvil plate 66 can be controlled by adjusting the air pressure used to operate pusher actuator 36. Additionally, although the combination of anvil/plate 66 and the detector assembly may have enough resiliency to assure generation of a click without damage to the container or its seal, it is preferred that a cushion 67 made of rubber or other suitable resilient material be attached to the anvil plate 66 to help prevent damage to sealing members 136, 138 and 140.

Figure 5:
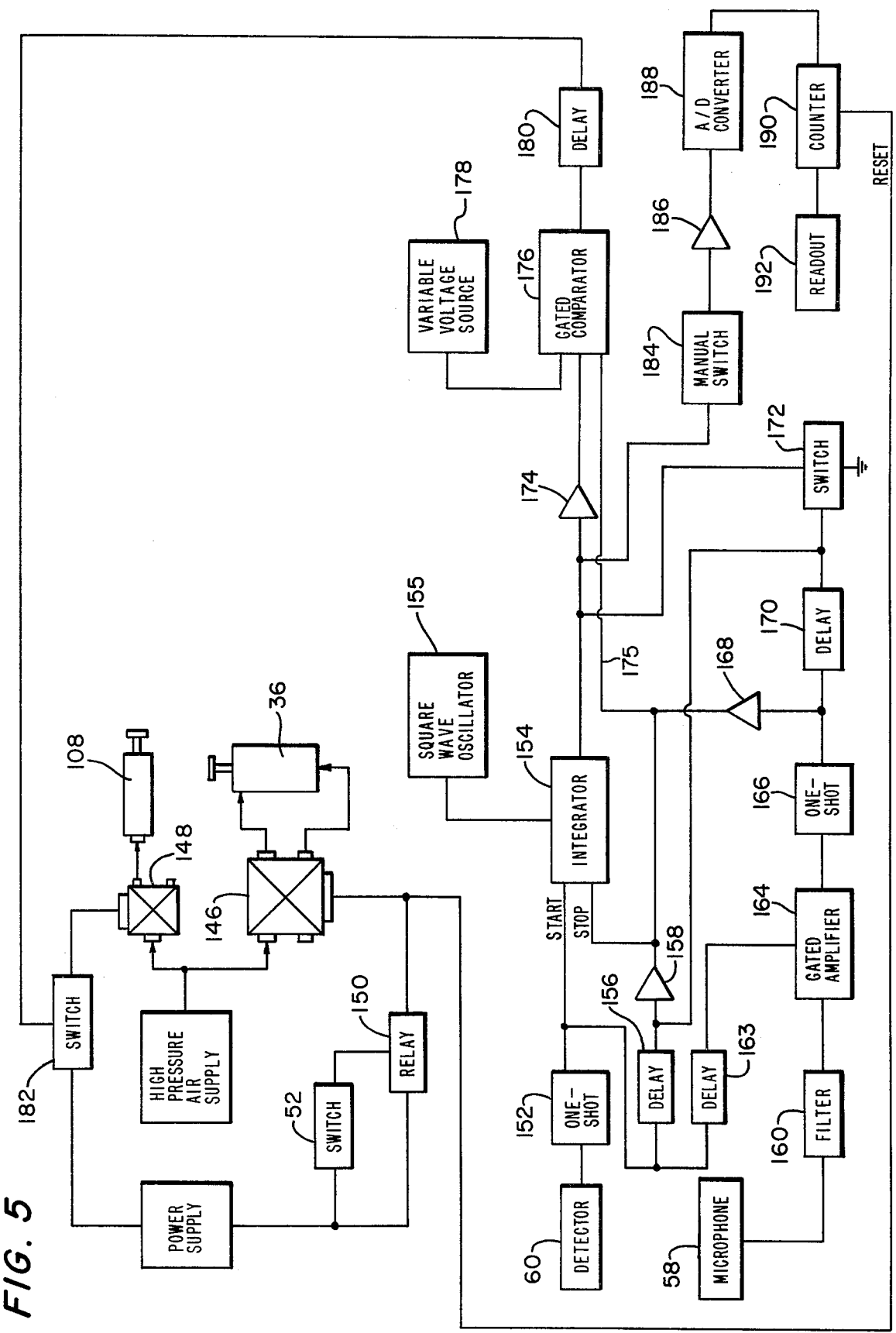
FIG. 5 is a diagram of the control and measuring system of the same apparatus.

FIG. 5 illustrates a preferred form of control and measurement system for the apparatus of FIGS. 1-4. Following is a description of the components of the system and its mode of operation. A suitable supply of high pressure air is connected to actuators 36 and 108 by means of a four-way solenoid valve 146 and a three-way solenoid valve 148. Valve 146 has an inlet port connected to the air supply, two outlet ports connected to opposite ends of the cylinder of actuator 36, and a fourth vent port. Valve 148 has an inlet port connected to the air supply, an outlet port connected to actuator 108, and a vent port. When the solenoids of the two valves are deenergized, the outlet valve 148 is connected to its vent port so as to keep piston rod 110 retracted, and valve 146 is set so that air is supplied to the "retract" inlet of actuator 36 while the "extend" inlet of the actuator is connected to the vent port of the valve. When the solenoids of the valves are energized, valve 148 will apply air to actuator 108 so as to cause the latter to extend its piston rod, and valve 146 will reverse positions so as to supply air to the "extend" inlet and vent air from the "retract" inlet of actuator 36.

The solenoid of valve 146 is connected to a suitable power supply by a delay relay 150 under control of normally closed switch 52. Relay 150 normally provides an open circuit between the power supply and the solenoid of valve 146 and is arranged to close the circuit momentarily each time switch 52 is closed. Thus, relay 150 is unaffected when a bottle shifts switch arm 54 to its second (switch-opening) position; however, when arm 54 returns to its at-rest (switch closing) position following its release by the bottle, relay 150 closes momentarily to energize the solenoid valve 146 and thereby cause actuator 36 to lift the bottle off of the conveyor up against anvil plate 66. Valve 146 recloses as soon as the relay reopens, causing the piston rod of actuator 36 to retract. This retracting action commences at about the same time that the container strikes the anvil plate and causes the piezoelectric detector assembly 60 to generate a voltage signal. This signal is fed to a one-shot circuit 152 which is triggered only if its input reaches a predetermined level. The output pulse generated by the one-shot is fed to the "start" input terminal of an integrator circuit 154 which is connected to integrate the output of a square wave generator 155. The output of one-shot 152 also is applied via a delay circuit 156 and an isolation amplifier 158 to the "stop" input terminal of integrator 154. The time delay afforded by delay circuit 156 is set so that it is substantially less than the time required for a container to be moved from the conveyor up to the anvil plate, back down to the conveyor and then out from under the anvil/detector assembly, but greater than the smallest acceptable time interval between a container striking the anvil and the microphone picking up a click emitted by the container as a result of its striking the anvil (the smallest acceptable time interval is that for a container with a predetermined minimum acceptable level of vacuum).

The stop input terminal of integrator 154 also is connected to respond to the output of microphone 58. To assure that the system is not affected by ambient noise, the output of microphone 58 is applied to a band pass filter 160 which is tuned to the frequency band of a click produced by a container known to have acceptable vacuum. The output of filter 160 is passed to an amplifier 164, which is gated by the output of one-shot 152 applied via a variable delay circuit 163 so that it will not respond to conveyor noise or the noise of the pusher striking the bottle or the noise of the bottle striking the anvil plate. Amplifier 164 also is designed to respond only to signals above a predetermined amplitude. The amplitude discrimination is employed for improved accuracy since the filtered click signal has a complex waveform having a major amplitude peak produced by the click preceded by one or more smaller amplitude peaks due to the filter failing to completely reject still existant but decaying sounds produced by the pusher striking the container and/or the container striking the anvil plate. The output of amplifier 164 is fed to a one-shot 166 which is triggered only if its input reaches a predetermined level. The output of the one-shot 166 is fed by an isolation amplifier 168 to the "stop" input terminal of integrator 154 and also to a second delay circuit 170. The latter is coupled on its output side to the control terminal of a transistor switch 172 which is connected between the output side of integrator 154 and ground. The control terminal of switch 172 also is connected to respond to the output of delay circuit 156. Switch 172 is normally open and closes in response to the delayed output of one-shot 156 or 166. It reopens when the output of the integrator is at ground potential.

Still referring to FIG. 5, the output side of integrator 154 is connected via an isolation amplifier 174 to a gated comparator 176 which compares the integrator output with a reference voltage provided by a variable voltage source 178. Comparator 160 is gated by the output of one-shot 166 applied via line 175. The output side of the comparator is connected via a variable delay circuit 180 to the control electrode of a normally open transistor switch 182 which connects the power supply to the solenoid of valve 148. Switch 182 is arranged to close when the output of comparator 176 exceeds a predetermined value and to reopen a short but predetermined interval after it closes, whereby valve 148 closes just long enough to cause actuator 108 to execute a container rejection stroke. Variable delay circuit 180 permits adjustment of the time at which actuator 108 is operated by valve 148. The output side of integrator 154 also is connected by a manual normally-open switch 184 and an isolation amplifier 186 to an analog-to-digital converter 188 whose output is applied to a counter 190. The output of the latter drives a readout or display 192 arranged to indicate the level of vacuum in inches of mercury or other units. Counter 190 has a reset terminal connected to the output of relay 150 so that the counter is reset each time switch 52 is reclosed, i.e., each time a new container is positioned on pusher 40.

Each time a container operates switch 52, actuator 36 is operated to thrust the container up against anvil plate 66, whereby the piezoelectric detector 60 provides an output signal that triggers one shot 152. The output of one-shot 152 starts integrator 154. Assuming that the container emits a clock, microphone 58 will produce a signal indicative of the click. The filtered microphone output is gated by amplifier 164 and the output of the latter triggers one shot 166. The output of one shot 166 acts to stop the integrator. During the interval that integrator 154 is "on", it integrates the square wave output of oscillator 155, so that when the integrator is "stopped" its output voltage is representative of the elapsed time between engagement of the container with anvil plate 66 and generation of the click sensed by the microphone (it is to be noted that the elapsed time will increase with increasing levels of vacuum, but the increase in time is not a linear function of decreasing vacuum). At the time integrator 154 receives its stop pulse from one-shot 166, the integrator output voltage is compared with the reference voltage provided by voltage source 178, by gated comparator 176 producing an output signal representative of the difference between the integrator output voltage and the reference voltage. Preferably the reference voltage is set so that it is slightly less than the value which the integrator voltage output would have as a result of a click produced by a container with a predetermined minimum acceptable vacuum. Thus if gated comparator 176 produces an output indicative of the integrator output less than the reference voltage, switch 182 will close to initiate operation of actuator 108, whereby the inspected container will be rejected. If the integrator output is equal to or more than the reference voltage, switch 182 will remain open and the inspected container will not be rejected. The parallel circuit involving delay 156 is provided to assure that the integrator will be stopped after a predetermined time in the event no click is produced by the impacted container. The time delay afforded by delay circuit 156 is set so that the integration process will stop a suitable time after the integrator voltage has reached a value great enough to prevent closing of switch 182. Regardless of whether the container is acceptable or not, the output of microphone 58, or if no click is detected, the output of detector 60, causes switch 172 to close after the integrator has "stopped", thereby resetting the integrator by shorting it to ground. Switch 172 reopens when the output terminal of integrator 152 is at ground potential.

Manual switch 184 provides the option of having or not having a visual display of the vacuum in each container as it is being inspected, or (by substituting a printer for the display) a permanent record of the level of vacuum in all of the containers undergoing inspection. The converter 188 digitizes the analog output of the integrator and counter 190 stores and counts the digitized signal and causes readout 192 to provide a display of the vacuum level as previously described. The counter and readout 192 are reset when the next container to be inspected trips switch 52.

Of course, other control and vacuum measuring and indicating systems may be designed by persons skilled in the art for use with the apparatus of FIGS. 1-4. Thus a purely digital technique may be employed to determine how soon the click is produced after the bottle is thrust upwardly against the anvil/detector assembly and measure the level of vacuum in the inspected container. It also is appreciated that the time of occurrence of the click may be measured from the time switch 52 is actuated rather than when the container strikes the anvil plate. However, because the click occurs within milliseconds after the container strikes the anvil plate, determining the vacuum level by measuring the time of occurrence of the click is less accurate by almost one order of magnitude if the measured time interval commences with operation of switch 52.

By way of example, it has been determined that in the case where an IV bottle filled with 1000 ml. of water and sealed under a vacuum of 20 inches of mercury is thrust up against the anvil by an actuator operated by 30 psi air, the time of the click produced is about 70 milliseconds measured from the time that air is supplied to the "extend" inlet of actuator 36 and about 5 milliseconds measured from the time that the bottle strikes the anvil. On the other hand with a bottle sealed under a vacuum of 25 inches of mercury, the corresponding click times are about 90 and 11.8 milliseconds respectively. The greater sensitivity afforded by measuring the delay in time from the moment the container impacts the anvil plate makes it easier to discriminate between different but close levels of vacuum. This is particularly desirable for early detection of a trend to lower vacuum levels as may occur prior to a complete malfunction of the container sealing apparatus. Where a simple accept/reject decision is to be made, adequate results may be obtained if the control and measuring system is modified to measure the time of occurrence of the click from the re-closing of switch 52 on the energization of the solenoid of pneumatic valve 146.

It is to be noted also that the time of occurrence of the click is affected by the force with which the container is impacted against the anvil plate. Accordingly it is necessary for consistency of result for the air pressure applied to actuator 36 to be regulated closely, preferably to within about ±5 psi.

It also is contemplated that the invention could be modified so that the click is produced by striking the top of the container with a suitable blow. Thus, apparatus could be provided comprising a resilient support for the container and a hammer or other suitable impact device located about the support and arranged to be driven down to deliver a sharp blow to the upper end of the container. The resilient support may take the form of a conveyor belt, in which case the flexible belt will yield a limited extent under the force of the downwardly impacted container and then will stop the container's downward movement to allow the contents to slam against the bottom of the bottle to produce a click as previously described. A microphone located adjacent to the resilient support will detect the click and the time of occurrence of the click may be measured from the time the hammer is actuated to impact the container or, by mounting a piezoelectric detector in the hammer, from the time the hammer actually engages the container. Rejection of containers with insufficient vacuum may be achieved by a rejection mechanism similar to the one shown in FIGS. 1 and 2.

It is believed that more than one cavitation cavity may be produced when a container is tapped in accordance with this invention and that such cavities may or may not be of equal size or collapse at the same time. Whether or not more than one cavity occurs does not appear to be critical. In any event, the phenomenon of cavity formation and collapse occurs too fast to be seen by the naked eye but may be observed by high speed photography.

In the development of the present invention it has been determined that it is not necessary for effective cavatation tapping to dispose the container so that its opposite ends are vertically aligned. It also has been determined that the cavitation tapping technique is effective only if a vertical force of sufficient magnitude is applied to the container. If a container is subjected only to a horizontally directed force, no cavitation "click" will occur. Thus, a cavitaton click can be produced by orienting a vacuum-packed container horizontally i.e., so that its opposite ends lie in a common horizontal plane, and applying a suitable vertical force to the side wall of the container to effect its displacement. Of course, the force need not be exactly vertical; the force may be applied along an inclined axis provided that its vertical component is sufficiently great to produce a click as previously described.

It has also been determined that the cavitation tapping technique may be employed to test pressurized containers to make certain that there has been no leak. Thus, for example, the invention may be employed to test bottles of carbonated beverages to make certain that the bottles have a suitable fluid pressure therein. In the case of pressurized containers, a click can be produced if the containers are struck with sufficient force. In most cases, the force required to produce a click by cavitation tapping a pressurized container is substantially greater than the force required to achieve the same effect with vacuum packed containers. Also in the case of testing pressurized containers, the measurement procedure is the inverse of that employed with vacuum packed containers where the measurement is made according to the time-based technique employed in the system of FIG. 5. Since the delay of the click is proportional to the amount of vacuum in a vacuum packed container, in the case of a pressurized container the longer the delay of the click, the less acceptable the container, i.e., a pressurized bottle of a carbonated beverage will have a relatively short delay if it is suitably pressurized and a relatively long delay if it is poorly pressurized or has completely lost its carbonation. Since the delay of the click is also proportional to the amount of force applied to the container, the harder the force the longer the delay. Thus although the delay with pressurized containers tends to be relatively short, by suitably increasing the magnitude of the force used to displace the container, it is possible to achieve a delay which can be accurately measured and which is sufficiently great over the range of pressures to be measured to permit distinguishing good containers from bad containers.

An alternative embodiment of the invention involves discriminating among vacuum-packed containers by measuring the magnitude of the sound produced when containers are subject to cavitation.

This alternative measurement method is based on the realization that if a sufficient tapping force is used, even a container with an unacceptable level of vacuum, e.g., a container at atmospheric pressure, may be made to emit a click. However, for a given force, the intensity of the click from a poorly evacuated container will tend to be less than that from a properly evacuated container. Hence, discrimination can be effected by measuring the click, if any, according to a function of its intensity*. If the click intensity function is above a predetermined value, the container is acceptable; otherwise it is not acceptable. Obviously a vacuum-packed container that emits no click is not acceptable. A necessity with this technique is to apply the same force to each container. This requirement is met by the apparatus of FIGS. 1–3.

*The term "intensity" is used in its acoustic sense and is measured in watt/m$^2$ (see Hueter et al, Sonics, Table 1.2., J. Wiley & Sons, Inc., 1955; Library of Congress Catalog No. 55-6388.

Figure 6:
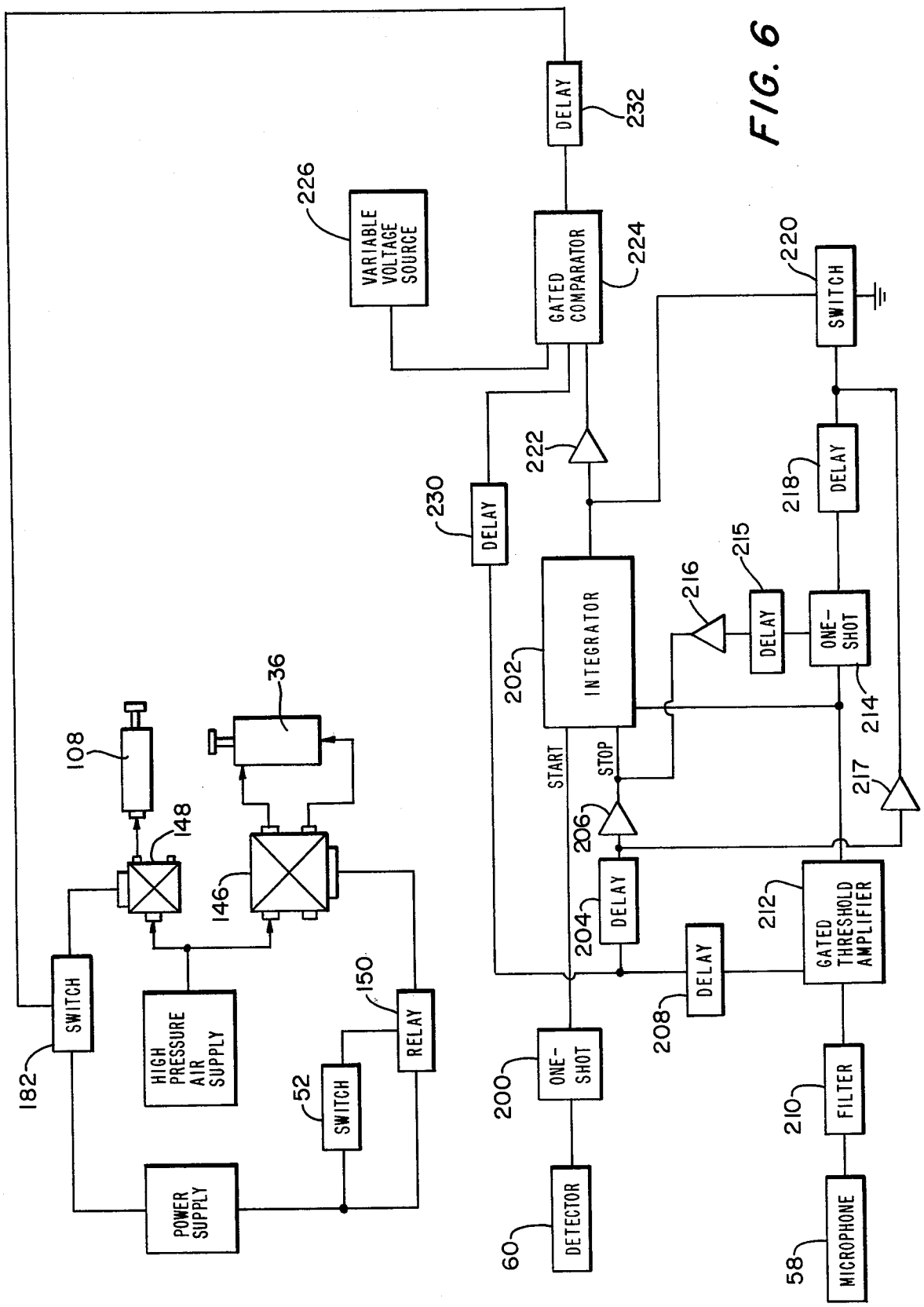
FIG. 6 is a diagram of an alternative embodiment of the invention.

The apparatus disclosed in FIGS. 1-3 may be modified for discrimination according to a function of click intensity by replacing the control and measuring system of FIG. 5 with the system disclosed in FIG. 6. This modified system may be used for inspecting vacuum-packed containers where a greater error in accuracy of measurement may be tolerated than is acceptable in the case of inspecting containers with sterile products such as IV or salt solutions. With this alternate embodiment of the invention, it is again preferred to gate the measurement system so as to diminish or eliminate any errors which may occur from noise produced by operation of the lifter member 40 or other associated or nearby equipment.

Referring now to FIG. 6, the detector 60 is connected to a one-shot 200 whose output is applied directly to the START terminal of an integrator 202 and also via a delay 204 and an isolation amplifier 206 to the STOP terminal of the same integrator. The output of one-shot 200 is also connected via a delay 208 to the gate terminal of a gated threshold amplifier 212 which has its input terminal connected to a filter 210 which receives the output of microphone 58. Filter 210 is a narrow bandpass filter which is adapted to pass signals having the frequency characteristic of clicks produced by cavitation tapping of containers. Amplifier 212 is arranged so that when gated on it will amplify only signals above a predetermined amplitude level, which level exceeds that of background noise and is close or equal to the minimum level of signals produced by tapping containers having internal fluid pressures that barely meet the minimum standard of acceptable containers. Amplifier 212 also is adapted to stay on for a period of time slightly in excess of the maximum time duration of signals produced by a click. The output of amplifier 212 is applied to the input terminal of integrator 202. A one-shot 214 connects the output terminal of amplifier 212 to the STOP terminal of integrator 202 via a delay 215 and an isolation amplifier 216. One-shot 214 also is connected through a delay 218 to a switch 220 which is connected between ground and the output terminal of integrator 202. An isolation amplifier 217 connects the output of delay unit 204 to the input of switch 220. The switch 220 is normally open and closes momentarily on receipt of a pulse from one-shot 214 or 200. Closing of switch 220 resets integrator 202 by shorting it to ground. The output of integrator 202 is connected by an isolation amplifier 222 to a gated comparator 224. A variable voltage source 226 is connected to the second input terminal of comparator 224. Comparator 224 is gated on by the output of one-shot 200 which is applied via a delay 230. The output of comparator 224 is connected by a delay 232 to switch 182.

The several delays 204, 208, 218, 230 and 232 are set so as to permit the circuit to operate in the following manner: When a can is thrust against the anvil plate, detector 60 produces an output signal which triggers one-shot 200. The output pulse from one-shot 200 turns on amplifier 212 in time for the amplifier to receive the filtered signal output from microphone 58 and filter 210 which occurs as a result of a click being produced by the container which was thrust against the anvil plate. The integrator 202 is turned on by the pulse output of one-shot 200 in time to receive the full click-derived output of amplifier 212. The time delay afforded by delay 204 is set so that it is less than the time required for a container to be moved from the conveyor up to the anvil plate, back down to the conveyor and then out from under the anvil/detector assembly, but greater than the time interval between a container striking the anvil and the end of the click-derived signal output of amplifier 212. Hence if no output is produced by amplifier 212 in response to the tapping of a container, nevertheless the output of delay 204 will stop the integrator and also cause switch 220 to reset the integrator. Otherwise integrator 202 is stopped by the output of one-shot 214. The time delay afforded by delay 215 is set so that it will stop the integrator after the click-generated signal output of microphone 58 has passed through amplifier 212, thereby assuring that the entire signal is integrated by integrator 202. Delay 218 assures that switch 220 will discharge integrator 202 only after integration of the click-generated signal has been completed. Delay 230 is set to gate the comparator after the integrator has had an opportunity to fully integrate the click-derived pulse output of amplifier 212. The output of the comparator is a voltage proportional to the time integral of the intensity of the click-induced signal output of amplifier 212. The reference voltage obtained from the variable voltage source 224 is set so that comparator 224 will produce an output signal effective to close switch 182 only if the output of integrator 202 is below a predetermined value representative of an acceptable container. Comparator 224 is gated on just long enough to make the required comparison measurement. It may be adapted to reset automatically or in response to a suitable reset pulse, e.g., the output of delay 218.

As is obvious to a person skilled in the art, this system of FIG. 6 time integrates the intensity of the signal pulse produced by the click rather than merely measuring its peak intensity, thereby allowing for the fact that the envelope of a click signal may have several relatively small peaks instead of a single relatively large peak. As a further modification of the invention, the system of FIG. 6 may be made to respond solely to the peak intensity of the click-produced signal. This may be achieved by eliminating integrator 202, comparator 224, voltage source 226, and the connections for those components, and (1) coupling the output of one-shot 200 to switch 182 via a suitable delay and (2) connecting n.o. switch 220 between ground and the lead connecting switch 182 to valve 148, whereby amplifier 212 will be gated on by one-shot 200 as previously described, and one-shot 214 will fire only if the output of amplifier 212 reaches a predetermined value indicative of an acceptable container. Application of the output of one-shot 200 to switch 182 is delayed just enough so that if one-shot 214 fires, switch 220 will close and short out switch 182 before the latter can react to the output of one-shot 200. Switch 220 will stay closed long enough to prevent switch 182 from responding to the output of one-shot 200. If switch 220 is not closed, the output from one-shot 200 will cause switch 182 to operate ejector actuator 108. Hency only containers not good enough to cause one-shot 214 to fire will be ejected.

What is claimed is:

1. Method of inspecting vacuum packed containers to determine the level of vacuum therein comprising:
    subjecting a vacuum packed container of a liquid or semi-liquid to a sharp force applied so that successively (1) at least one cavity is formed in the liquid or semi-liquid as a result of relative vertical displacement of said container and contents in a first direction and (2) the cavity is eliminated and an audible sound is produced as a result of relative vertical displacement of said container and contents in a second opposite direction;
    providing a first signal representative of the interval between the time at which said container is subjected to said force and the time at which said sound is detected; and generating in response to said first signal a second signal indicative of whether the level of vacuum in said container is less than or exceeds a predetermined value.

2. Method according to claim 1 wherein said container has a top end and a bottom end and the sharp blow is applied by striking its top end.

3. Method according to claim 1 wherein said container has a top and a bottom end and the sharp blow is produced by driving its top end against a fixed obstruction.

4. Method according to claim 3 wherein said container has a narrow necked top end.

5. Method according to claim 3 wherein said container is closed off by a rubber stopper.

6. Method according to claim 3 wherein said container is driven upwardly against a resilient obstruction.

7. Method according to claim 3 wherein said container has a top end and a bottom end and the sharp blow is produced by striking its top end with an impact member so as to drive the container downward against a resilient support.

8. Method according to claim 1 wherein said second signal is indicative of the fact that said container has an unsatisfactorily level of vacuum therein when said first-mentioned signal is less than a predetermined value.

9. A method of inspecting a plurality of vacuum-packed containers of a liquid product to determine the level of vacuum therein comprising:
   transporting said containers in series to an inspection station;
   subjecting each container at said inspection station to a sharp force applied so that an audible sound is produced as a result of relative displacement of the container and its contents;
   providing a control signal representative of the interval between the time at which said container is subjected to said force and the time at which said sound is detected; and
   accepting or rejecting said containers according to the magnitude of said signal.

10. Method according to claim 9 wherein said control signal is produced by producing a first time signal in fixed time relation to the time said container is subjected to said sharp force, producing a second time signal in response to the occurrence of said sound, and generating said control signal in accordance with the time difference between said first and second time signals.

11. Apparatus for inspecting vacuum-packed containers to determine the level of vacuum therein comprising:
   means for subjecting a vacuum-packed container of a liquid to a sharp force so that an audible sound is produced by relative displacement of the container and liquid;
   means for detecting said audible sound; and
   signal generating means for providing a signal according to the interval between the time at which said container is subjected to said force and the time at which said sound is detected.

12. Apparatus according to claim 11 further comprising means for generating a signal indicative of the fact that the level of vacuum in said container is less than a first predetermined value when said first-mentioned signal is less than a second predetermined value.

13. Apparatus according to claim 11 wherein said means for subjecting said container to a sharp force comprises an obstruction and means for thrusting the container against said obstruction.

14. Apparatus according to claim 13 comprising a conveyor for conveying the container to a station beneath said obstruction, and further wherein said means for thrusting the container against said obstruction is located at said station.

15. Apparatus according to claim 14 wherein said detecting means is a sound-to-electrical energy transducer located adjacent to said station.

16. Apparatus according to claim 14 comprising means for generating a control signal when said container strikes said obstruction, and further wherein the signal provided by said signal-generating means has a time base commencing with the occurrence of said control signal.

17. Apparatus according to claim 16 further including means for removing the container from said conveyor when the magnitude of said time interval is less than a predetermined value.

18. Apparatus for inspecting sealed containers of a liquid to determine the level of fluid pressure therein comprising:
   means for subjecting a sealed container of a liquid to a sharp force so that an audible sound will be produced by relative displacement of the container and liquid if the fluid pressure within the container is beyond a predetermined value;
   means for detecting said audible sound;
   first signal generating means for providing a first signal in response to said audible sound whereby said first signal has a magnitude varying with the intensity of said sound; and
   second signal generating means responsive to said first signal generating means for producing a second signal indicative of the fact that the fluid pressure in said container is beyond said first predetermined value when said first-mentioned signal exceeds a second predetermined value.

19. Apparatus according to claim 18 wherein said first signal generating means is arranged so that said first signal varies according to the acoustic energy or peak amplitude of said audible sound.

20. Apparatus according to claim 19 wherein said first signal generating means is normally off and is gated on synchronously with the occurrence of said sharp force 21. Apparatus according to claim 20 wherein said means for subjecting said container to a sharp force comprises an obstruction and means for thrusting the container against said obstruction.

22. Apparatus according to claim 21 comprising a conveyor for conveying the container to a station beneath said obstruction, and further wherein said means for thrusting the container against said obstruction is located at said station.

23. Method of inspecting sealed containers of a liquid to determine the level of fluid pressure therein comprising:
   subjecting a sealed container of a liquid to a sharp force so that an audible sound will be produced by relative displacement of the container and liquid if the fluid pressure within the container is beyond a first predetermined value;
   detecting said audible sound;
   generating a first signal in response to said audible sound having a value varying with a function of the intensity of said sound; and
   generating a second signal in response to said first signal indicative of the fact that the fluid pressure in said container is beyond said first predetermined value when said first signal exceeds a second predetermined value.

24. Method according to claim 23 comprising the steps of transporting a plurality of said containers in series to an inspection station and subjecting said containers to said sharp force at said inspection station; and
   accepting or rejecting each of said containers according to the magnitude of the said second signal generated for said each container.

25. Method of inspecting a sealed container of a liquid or semi-liquid to determine the level of fluid pressure therein comprising:
   subjecting said container to a sharp force applied so that successively (1) at least one cavity is formed in the liquid or semi-liquid as a result of relative vertical displacement of said container and its contents in a first direction and (2) the cavity is eliminated and an audible sound is produced as a result of relative vertical displacement of said container and its contents in a second opposite direction;

providing a signal representative of the interval between the time at which said container is subjected to said force and the time at which said sound is detected; and generating according to the magnitude of said signal an indication of whether or not the fluid pressure in said container is at an acceptable level.

26. Method according to claim 25 wherein said container has a top end and a bottom end and the sharp blow is applied by striking its top end.

27. Method according to claim 25 wherein said container has a top and a bottom end and the sharp blow is produced by driving its top end against a fixed obstruction.

28. Method according to claim 27 wherein said container is driven upwardly against a resilient obstruction.

* * * * *